United States Patent [19]

McLaughlin

[11] Patent Number: 4,671,981
[45] Date of Patent: Jun. 9, 1987

[54] REMOVABLE AUTOMOBILE FLOOR CARPET IN THE SAME PLANE AS THE FIXED AUTOMOBILE FLOOR CARPET

[76] Inventor: John J. McLaughlin, 3634 Winchester Ave., Atlantic City, N.J. 08401

[21] Appl. No.: 646,509

[22] Filed: Sep. 4, 1984

Related U.S. Application Data

[63] Continuation-in-part of Ser. No. 499,591, Jun. 3, 1984, abandoned.

[51] Int. Cl.⁴ .............................................. B32B 3/06
[52] U.S. Cl. ...................................... 428/95; 428/99; 428/100
[58] Field of Search ........................... 428/95, 99, 100

[56] References Cited

U.S. PATENT DOCUMENTS 4,262,048  4/1981  Mitchell ................................. 428/99
4,361,610  11/1982  Roth ...................................... 428/95
4,481,240  11/1984  Roth ...................................... 428/95

Primary Examiner—Marion C. McCamish

[57] ABSTRACT

A removable section of automobile carpet is provided with a fastener surrounding its border so that it can be removed and cleaned then reinserted, back to its original well area wherein it is fastened back in place, by joining the main floor automobile carpet. A modification permits a removable section of magnetized material in each automobile well area to be lifted out for disposal of dirt swept onto its surface from the main floor carpet.

7 Claims, 15 Drawing Figures

REMOVABLE AUTOMOBILE FLOOR CARPET IN THE SAME PLANE AS THE FIXED AUTOMOBILE FLOOR CARPET

This application is a Continuation in Part which includes new material bering on my previous application for patent for a Removable Automobile Floor Carpet, Ser. No. 06/499.591 dated June 3, 1984, now abandoned.

This Continuation in Part application is submitted before the expiration of the original application in order to obtain the original filing date for material common to both applications.

This invention relates to a carpet or other floor covering with removable sections located in the well areas of an automobile and enjoined to the main body of the carpet by means of a zipper, velcro type fastener, or magnetized material for removal and replacement for the process of cleaning accumulated dirt.

In operation this invention provides for the debris that gathers all over an automobile floor, well areas or not, to be swept without bi-level hindrance to the surface of the removable sections which then would be unjoined and lifted to the outside of the car for cleaning, following which they would be returned to their places in the main floor carpet.

Carpets have long been used in automobiles and they have necessarily been made resilient to the foot motion of people entering or leaving, as well as those normally accompanying sitting for long stretches of time, but in the driving well area pedals control use prompts excessive foot motion grinding debris into the carpet wearing it away so that as a consequence most manufacturers have found it necessary to glue reinforcement covers, adding to the cleaning problem by providing still more recesses for dirt to lodge.

In this invention, in order to sweep the debris from the main floor covering to the removable sections with the least hang up I have provided for the carpets, both main and removable to be in the same plane or with the removable section surface lower than the main floor carpet surface. To keep them in the same plane the removable carpet fits into holes or cut-outs in the main carpet. The holes extend through the carpet to the automobile floor or partially through, ending at the carpet backing.

Another modification of this invention is provided for those automobiles which are furnished with carpet whose tufts have a high profile, able to permit a mat of magnetized material through its attraction to the steel automobile floor to nestle into the carpet and allow swept dirt to enter the mat's surface without hindrance and still permit the mat to be lifted off for cleaning.

Therefore, carpeted wells that are formed into the automobile floor are hard to clean. In the driving well area, reinforcement must be expensively built-in to the carpet to offset hard wear.

Therefore, an object of this invention is to provide a removable carpet for the well pocket areas, that would be unzipped (or otherwise unjoined) and removed to outside the car where dirt would be brushed away and the now clean section zipped or pressed back into place.

An additional object of this invention is cost effective as its easy replaceability would eliminate employing expensive materials to reinforce the heavy wear driving well area.

These replaceable carpet sections would be further cost effective as they would occur in the area where foot movement causes the most severe wear spots and their application would lengthen the time that the car's appearance would remain first class.

These replaceable carpet sections would be a cosmetic improvement, as they could be made distinctive from the surrounding carpet by design, shape, texture, or color.

My invention consists of the combination and arrangement of a removable carpet that can be joined to the fixed main carpet as illustrated in the accompanying FIGS. 1-15 of the drawings.

Figure 1:
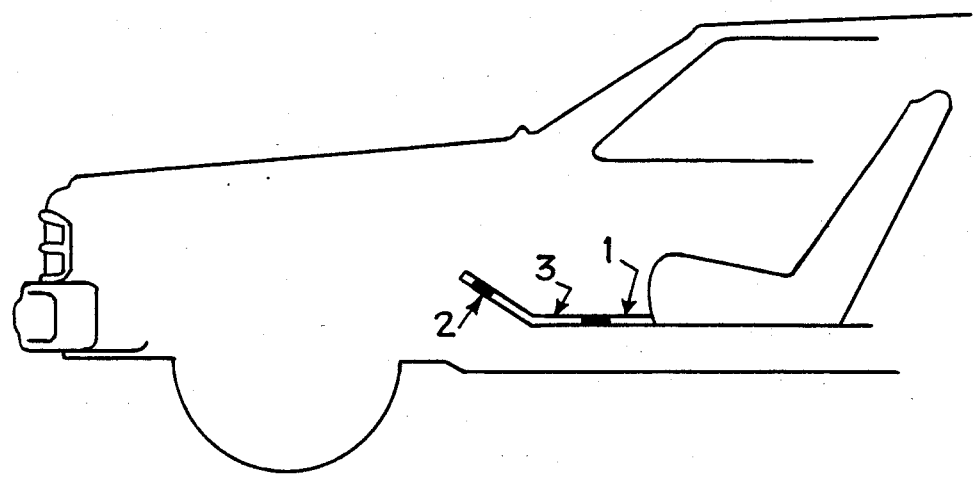
FIG. 1 is a side view (elevation) of the front half of an automobile with the relative removable carpet contour indicated.

Turning now to FIG. 1 it will be seen that the invention embodies a fixed floor carpet 1, a fastener outline 2 and a removable carpet 3 all in exactly the same plane. The fastener 2 is joined to both the main carpet 1 and the removable carpet 3 and is provided to separate and rejoin preferably without the need of tools.

Figure 2:
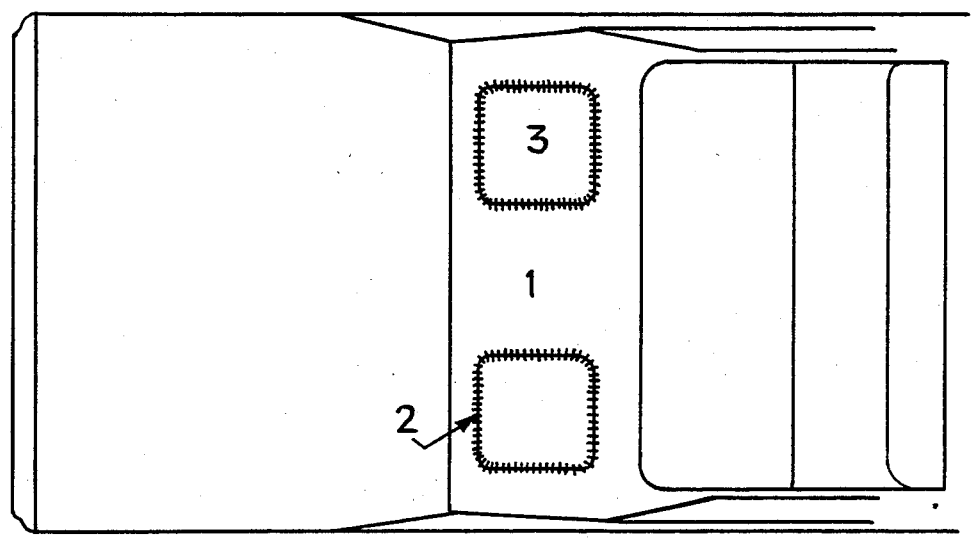
FIG. 2 is an overview (plan) of the front half of an automobile with two removable carpets outlined, one each on the driver and passenger side.

FIG. 2 indicates that the removable carpet 3 is continually bound with the fastener 2 to effect complete separation from the main carpet 1.

Figure 3:
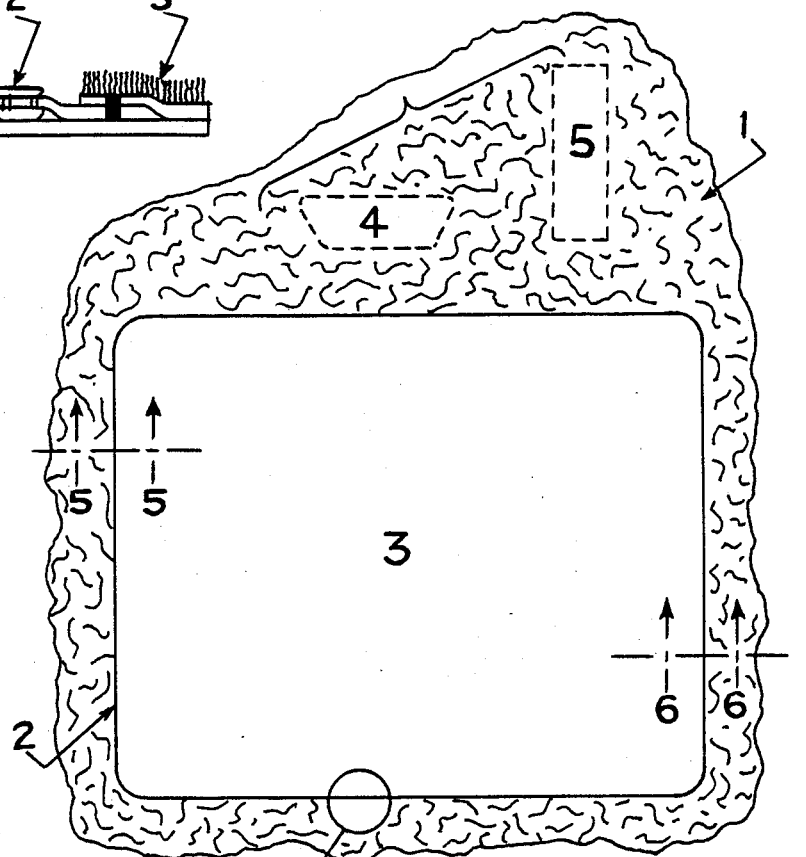

FIG. 3 is an outline of the zipper path set in the driver's well area and to the rear of the brake 4 and fuel 5 pedals.

Figure 4:
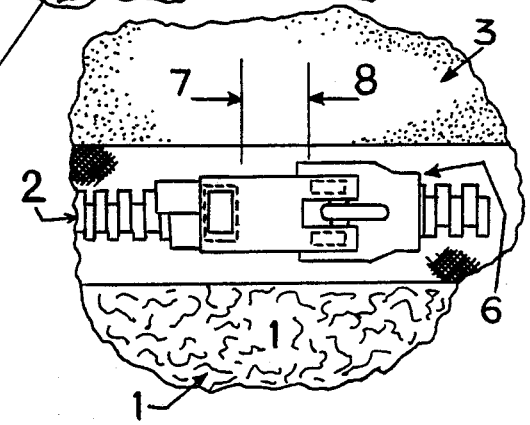

FIG. 4 is an enlarged view of the zipper closure 6 and its fastened position near the seating to avoid foot contact. The pull tab magnetized, as one method of keeping it firmly folded at the same time it holds the zipper material in place in the unjoined area between the rests 7 and 8.

Figure 5:
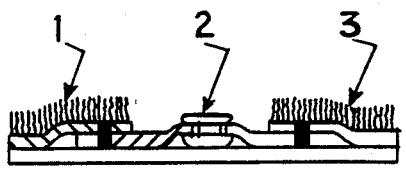

FIG. 5 is a fragmentary sectional view taken along lines 5—5 of FIG. 3. In this view the removable carpet opening is cut away to the floor and the main floor side of the zipper material is joined to the underside of the main floor carpet backing.

Figure 6:
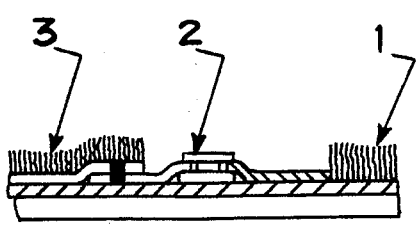

FIG. 6 is an alternate fragmentary sectional view taken along lines 6—6 of FIG. 3. In this view the removable carpet opening is only cut away to the carpet backing and the main floor side of the zipper material is joined to the upperside of the carpet backing in the opening area.

Figure 7:
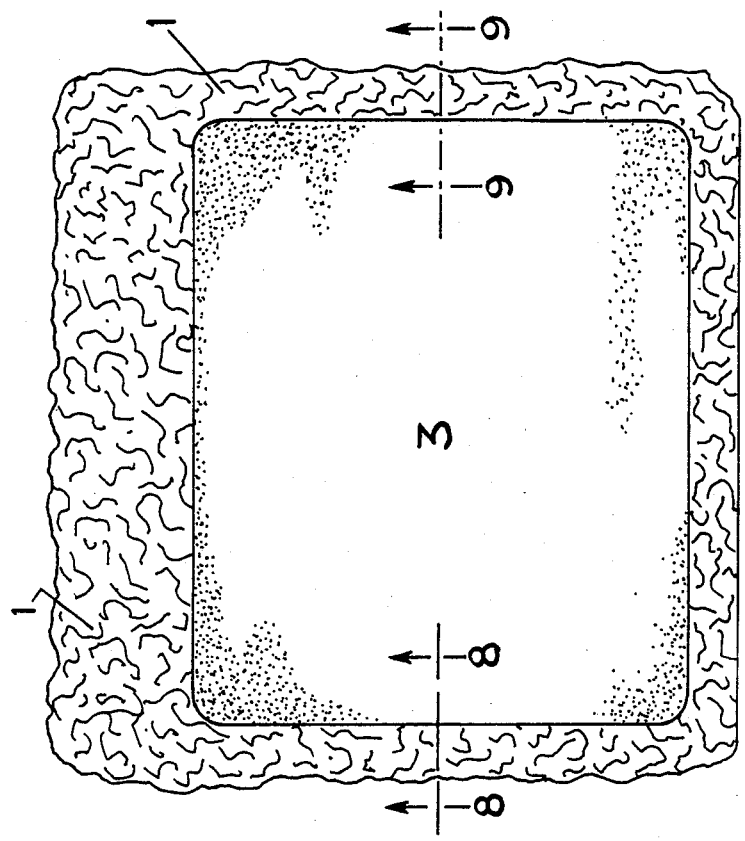

FIG. 7 is an outline of a velcro type fastener path set in the well area of an automobile.

Figure 8:
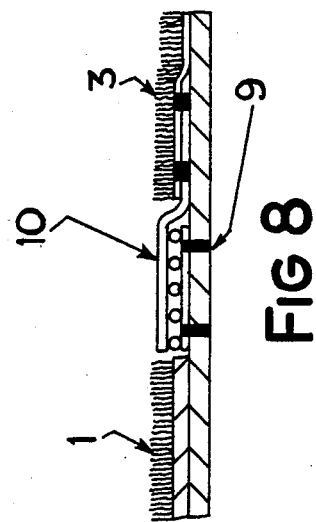

FIG. 8 is a fragmentary sectional view taken along lines 8—8 of FIG. 7. In this view the removable carpet opening is cut away to the floor and underside of the velcro type fastener 9 is joined to the floor and the topside 10 joined to the removable carpet 3.

Figure 9:
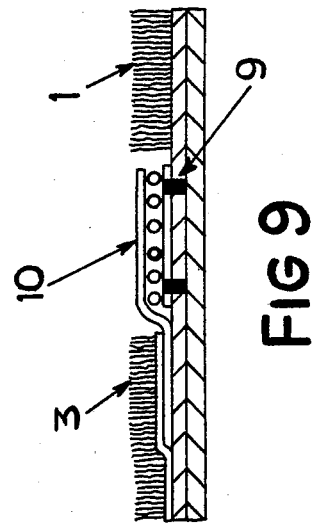

FIG. 9 is an alternate fragmentary sectional view taken along lines 9—9 of FIG. 7. In this view of the invention only the carpet pile of the removable carpet opening is removed and the underside of the velcro type fastener 9 is adhered to the main floor carpet backing with the topside 10 joined to the removable carpet 3.

Figure 10:
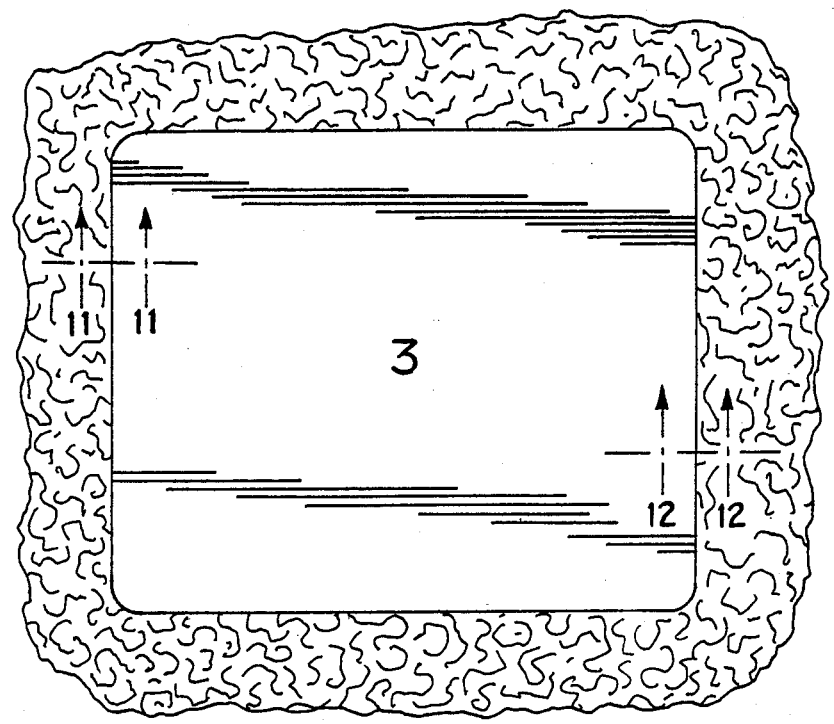

FIG. 10 is an outline of a magnetized removable carpet set in the well area of an automobile.

Figure 11:
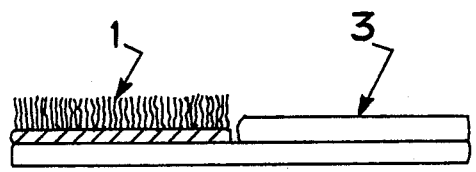

FIG. 11 is a fragmentary sectional view taken along lines 11—11 of FIG. 10 showing a removable carpet 3 magnetized to hold it in the opening of the main floor carpet 1. The opening in this view is cut away to the automobile floor.

Figure 12:
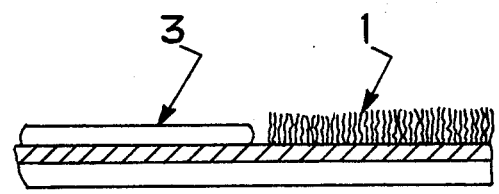

FIG. 12 is an alternate fragmentary sectional view taken along lines 12—12 of FIG. 10 showing a removable cover 3 magnetized to hold it in the opening of the main floor carpet 1. The opening is only cut away to the main floor carpet backing.

Figure 13:
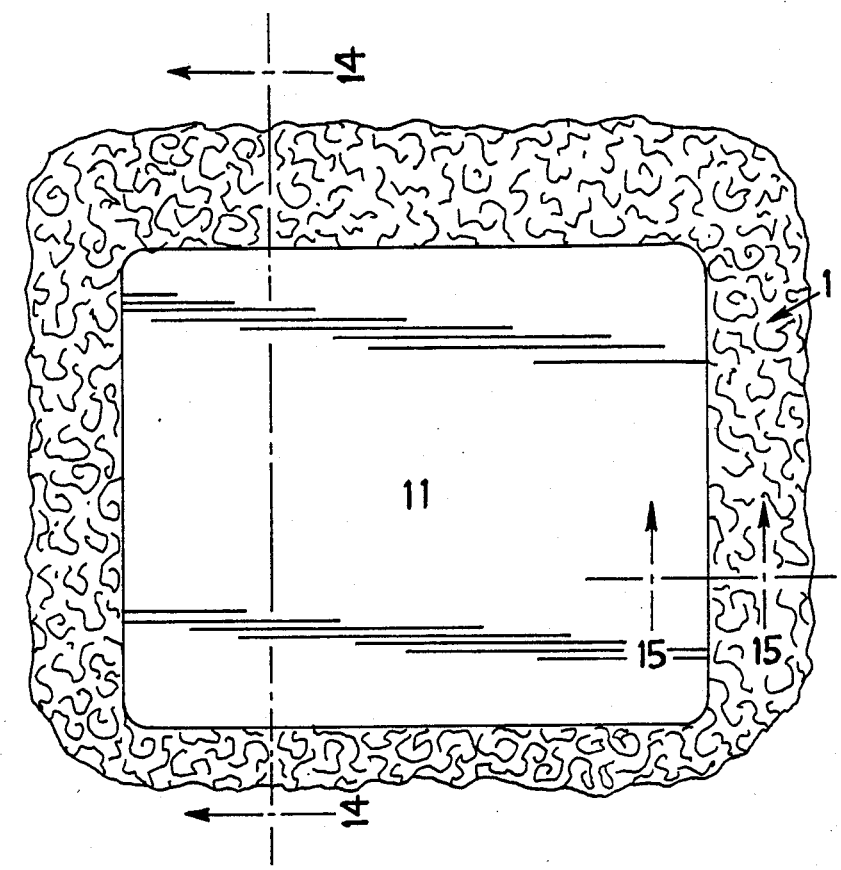

FIG. 13 is another outline of a magnetized removable floor covering 11 set in the well area of an automobile with the covering above the main fixed carpet and with the rim chamfered to aid in collecting the debris swept from the main fixed carpet 1.

Figure 14:
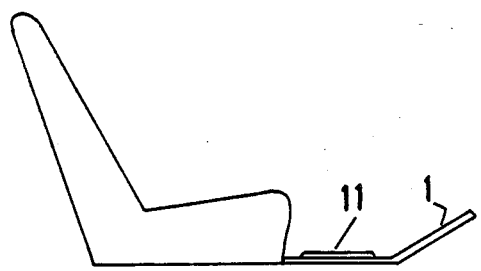

FIG. 14 is a view showing that the invention embodies a fixed main floor carpet 1 and a removable carpet 11 above it. The removable carpet is magnetized to hold its place in the well area of an automobile by clinging to the steel automobile floor and settling into the main floor carpet pile.

Figure 15:
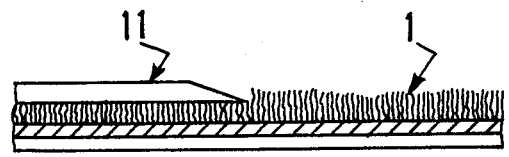

FIG. 15 is a fragmentary sectional view taken along lines 15—15 of FIG. 13 showing a magnetized removable covering 11 with a chamfered rim above the fixed main covering and settling into its pile.

I claim:

1. In combination a fixed automobile carpet having provision to separate and enjoin a removable carpet having the same plane and arranged in the well areas for cleaning and replacing.

2. In combination, a removable carpet arranged in the well areas of an automobile and bordered by a fastener that joins to and disjoins from the main floor carpet and with this removable carpet having the same plane as the main floor carpet.

3. In combination, a removable carpet having the same plane as the main floor carpet and arranged in the well areas of an automobile and held in place by means of either a zipper or a velcro type fastener depending on what is most suitable for the styling use or cost of the automobile.

4. In combination, a removable and replaceable floor carpet having the same or lower plane as the main floor carpet and arranged in the well area of an automobile in order to accept swept debris from the enjoined surrounding main floor carpet onto its surface for disposal outside the vehicle.

5. A removable, replaceable floor covering formed in whole or in part of magnetized material and having the same plane or lower plane as the main floor covering and arranged in the well areas of an automobile and held to its place by its attraction to the underlying steel floor.

6. In combination, a removable floor covering and arranged substantially in the well areas of an automobile and held in place by means of a zipper, velcro type fastener or magnetized material depending on what is most suitable for the styling use and cost of the vehicle.

7. In combination, a removable magnetized floor covering able to settle deep enough into the main floor carpet in the general well areas of an automobile by its attraction to the underlying steel floor to permit swept debris from the surrounding floor covering to enter its surface for lift-off disposal outside the vehicle.

* * * * *